United States Patent Office 3,248,654
Patented Apr. 26, 1966

3,248,654
TEMPERATURE COMPENSATED COMPUTER
Ken Shiragaki, Fuzisawa, Japan, assignor to Minneapolis-Honeywell Regulator Company, Minneapolis, Minn., a corporation of Delaware
Filed May 7, 1963, Ser. No. 278,718
Claims priority, application Japan, May 19, 1962, 37/20,633
1 Claim. (Cl. 328—3)

This invention relates to a temperature compensated computer, and more particularly, a computer in which, in the case of measuring a flow, an input signal current proportional to differential pressure of a fluid is compensated in temperature by means of a resistance thermometer consisting of a suitable resistive material, such as, nickel, platinum, etc., and thereby an output signal electric current which is proportional to the true flow is obtained.

In general, when flow is measured by using the differential pressure of a fluid the true flow of the fluid is inversely proportional to the absolute temperature of the fluid. Therefore, when the absolute temperature of the fluid is detected as a variation in resistance of a resistance thermometer by means of a temperature detecting circuit in which said resistance thermometer is incorporated, and the resistance thermometer is made the feed back resistor in a direct current amplifier, temperature compensation of a flow can be easily performed.

It is therefore an object of the present invention to provide a temperature compensated computer in which a true flow signal is obtained.

It is a further object of the present invention to provide a temperature compensated computer in which an input signal proportional to the differential pressure of a fluid is compensated in temperature to obtain an output signal proportional to the flow of the fluid.

Figure 1:
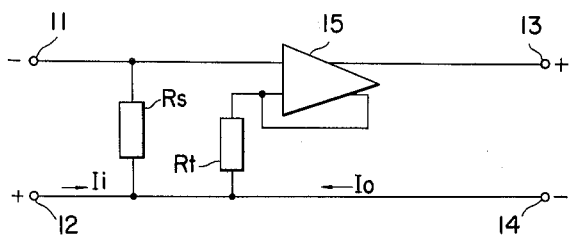
Figure 2:
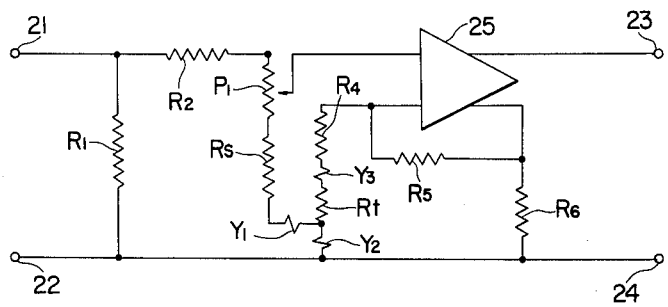
Figure 3:
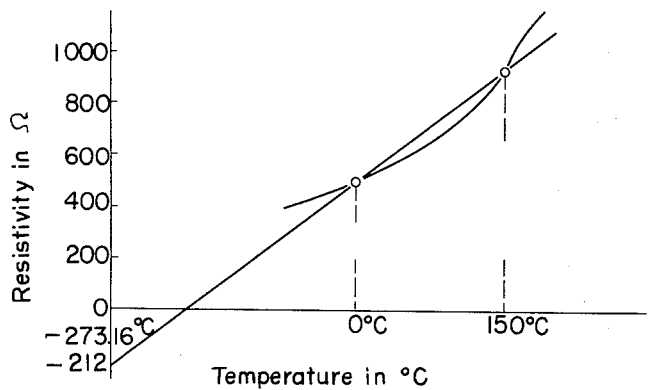

Other and further objects of the present invention will become apparent upon a study of the following specification taken in connection with the accompanying drawings wherein:

FIG. 1 is a schematic connection diagram which explains the principle of the temperature compensated computer provided in accordance with the present invention, FIG. 2 is a connection diagram of an embodiment of the temperature compensated computer provided in accordance with the present invention; and FIG. 3 is a graph showing the linearized temperature characteristics of a resistance thermometer made of nickel.

In accordance with the preferred embodiment of the present invention as illustrated in FIG. 1 of the accompanying drawings, a fixed resistor $R_s$ represents the resistance of a resistance thermometer at the reference temperature of a fluid and is connected across input terminals 11 and 12. Input terminal 11 is further connected to one of the input terminals of an amplifier 15 and the other of the input terminals of amplifier 15 is connected to said input terminal 12 and an output terminal 14, through a feedback resistor $R_t$. One of the output terminals of amplifier 15 is connected to an output terminal 13 and the other of the output terminals of amplifier 15 is connected back to the input terminal of the same amplifier. The operation of the computer shown in FIG. 1 is as follows: an input signal current I, proportional to the differential pressure $\Delta p$ of a fluid is supplied to the fixed resistor $R_s$ through the input terminals. The potential drop $I_iR_s$ generated across the fixed resistor $R_s$ is proportional to the product of the differential pressure $\Delta p$ and the reference temperature. The potential drop $I_iR_s$ is applied to the input terminals of amplifier 15 to generate the output current $I_o$ and the output current $I_o$ is fed back to amplifier 15 through feedback resistor $R_t$ as a feedback potential. The feedback resistor $R_t$ is a resistance thermometer in a temperature detecting circuit of a measured fluid and the thermometer resistance varies in proportion to the absolute temperature of the fluid so that the feedback potential $I_oR_t$ is proportional to the absolute temperature of the fluid. When the gain of amplifier 15 is made large the input potential is made equal to the feedback potential, that is, $I_iR_s=I_oR_t$, so that it becomes as follows:

$$I_o=I_i\frac{R_s}{R_t}$$

Accordingly, the output current $I_o$ is inversely proportional to the absolute temperature of the fluid and temperature compensation of the flow signal can be accomplished.

In FIG. 2 of the accompanying drawings, the input circuit is formed by resistors $R_1$, $R_2$, $P_1$, $R_s$, $Y_1$ and $Y_2$, and the feedback circuit is formed by resistors $Y_2$, $R_t$, $Y_3$, $R_4$, $R_5$ and $R_6$. The resistors $R_s$ and $R_t$ are the same as those explained in FIG. 1. When an input signal electric current $I_i$ which is proportional to the pressure difference $\Delta p$ of a fluid is applied to input terminals 21 and 22 in FIG. 2, as is stated in FIG. 1, the following relation is established between the input signal electric current $I_i$ and the output electric current $I_o$ and temperature compensation can be accomplished:

$$I_o=I_i\frac{R_s}{R_t}$$

In general, the variation of a resistance thermometer due to the temperature is non-linear and does not pass through the original point ($-273.16°$ C., 0), as shown in FIG. 3. In FIG. 3 the abscissa represents the temperature and the ordinate represents the resistance of a resistance thermometer. However, in the circuit shown in FIG. 2, by assuming the value of resistors $R_6$, $R_5$ and $R_4$ properly, a feedback resistor which has a linear characteristic passing through the original point ($-273.16°$ C., 0) can be obtained.

In the circuit of the computer provided in accordance with the present invention, temperature compensation can be accomplished over a range of a temperature from 0° C. to 150° C. and accuracy of the computation is ±0.5% when the wiring resistors $Y_1$, $Y_2$ and $Y_3$ are 0 to 5 ohm respectively.

Heretofore, a surbo type or a beam type computer has been used for the purpose of temperature compensation. However, in a computer provided in accordance with the present invention, temperature detection and the computation are performed in the same circuit and therefore, with apparatus of simple construction temperature compensation having high accuracy and stability can be performed over a wide range.

Other modifications of the present invention will be apparent to those skilled in the art and it is not intended that the scope of the present invention be limited solely by the scope of the appended claim.

What is claimed is:

A compensated computer circuit comprising a current amplifier having a pair of amplifier input terminals and a pair of amplifier output terminals, a pair of circuit input terminals arranged to be connected to an input signal source, a pair of circuit output terminals, a current feedback circuit connected between a first one of said amplifier input terminals and a first one of said circuit input terminals, said feedback circuit including a condition sensitive impedance element arranged to measure a condition of an input signal source, an input impedance connected across said circuit input terminals and having a value equal to that of said impedance element at a predetermined level of the measured condition of the input signal source, first circuit means connecting said first one of said circuit input terminals to a first one of said circuit output terminals, second circuit means connecting a second one of said input terminals to a second one of said amplifier input terminals and third circuit means connecting a second one of said amplifier output terminals to a second one of said circuit output terminals, whereby said condition sensitive impedance element compensates an input signal applied to said circuit input terminals from said input signal source according to said condition of said input signal source.

References Cited by the Examiner

UNITED STATES PATENTS

| | | | |
|---|---|---|---|
| 2,572,108 | 10/1951 | Chalhoub | 330—143 |
| 2,580,782 | 1/1952 | Hoffmann et al. | 73—204 |
| 2,683,777 | 7/1954 | Anderson | 330—14 X |
| 2,726,546 | 12/1955 | King | 73—204 |
| 2,867,774 | 1/1959 | Bell | 330—86 X |
| 2,925,559 | 2/1960 | De Santels | 340—228 X |
| 3,085,431 | 4/1963 | Yerman et al. | 73—204 |
| 3,091,939 | 6/1963 | Baude | 328—3 X |

ARTHUR GAUSS, *Primary Examiner.*

JOHN W. HUCKERT, *Examiner.*

M. LEE, *Assistant Examiner.*